Figure 1:
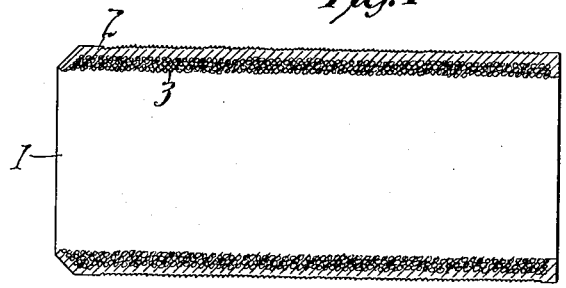

J. W. AYLSWORTH.
PROCESS FOR MAKING PHONOGRAPH RECORDS.
APPLICATION FILED SEPT. 7, 1912.

1,110,417.

Patented Sept. 15, 1914.

Witnesses:
S. B. Dressler
Frederick Pachmann

Inventor:
Jonas W. Aylsworth
By Frank L. Dyer
his Atty.

UNITED STATES PATENT OFFICE.

JONAS W. AYLSWORTH, OF EAST ORANGE, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

PROCESS FOR MAKING PHONOGRAPH-RECORDS.

1,110,417.  Specification of Letters Patent.  Patented Sept. 15, 1914.

Original application filed May 25, 1909, Serial No. 498,357. Divided and this application filed September 7, 1912. Serial No. 719,094.

*To all whom it may concern:*

Be it known that I, JONAS W. AYLSWORTH, a citizen of the United States, and a resident of East Orange, Essex county, New Jersey, have made a certain new and useful Invention in Processes for Making Phonograph-Records, of which the following is a description.

This invention relates to a process of producing phonograph records, this application being a division of my application, Serial No. 498,357, filed May 25, 1909.

The object of my invention is to produce a light weight strong phonograph record, which will have a hard resisting surface smooth and free from defects and a porous backing of a similar substance which will contribute mechanical strength and acoustic solidity without the use of as much material as would be necessary if the record were made solid or backed with solid material.

The result above referred to is preferably accomplished by casting in a rotating mold a composition containing ingredients which cause the same to foam copiously or evolve gases during the formation of the record to cause the same to be spongy and porous, while the outer record surface of the same which is in contact with the mold will be free from bubbles and similar defects. More specifically, my invention is accomplished by casting in the manner referred to a record of a composition, the ingredients of which react on sufficient application of heat to form a hard infusible condensation product. In my present invention, a composition of this character is made use of in which the ingredients are so chosen and proportioned as to cause excessive foaming or the evolution of dissociation gases during the transition of the material from the molten plastic state to a solid plastic or non-plastic state, the product, caused by the evolution of such gases, being porous and spongy throughout its mass, while the record surface thereof is smooth and free from bubbles.

A composition such as that described may be made by adding an excess of paraformaldehyde, di- or tri- oxymethylene, or other suitable aldehyde to a composition having a formula such as Formula No. 1 in my application No. 496,060 for plastic composition and process of manufacturing the same, filed May 14, 1909. The formula referred to is:—

(1) Phenol resin ............................ 100 parts by weight.
    Polymerized formaldehyde ........ 5 to 7   "    "    "
    Benzoic anhydrid .................... 5 to 10  "    "    "

The excess of polymerized formaldehyde above the proportion in the foregoing formula causes the mass to foam during the transition from the molten plastic to the hard solid condition. The proportion in which the polymerized formaldehyde is present in excess may vary within wide limits. Referring to the formula given above, an excess of from 1 to 4 parts of polymerized formaldehyde is given by way of example. With such a composition the surface next to the record surface of the mold is formed in a thin layer of material free from porosity. The thickness of such layer may be controlled at will by pouring in the mold first an amount of a mass so constituted that it will not foam while changing from the molten plastic to a non-plastic or a solid condition, subsequently pouring in the mold the mass which is designed to foam or evolve dissociation gases whereby the porous backing or body of the record is formed.

Attention is hereby directed to the accompanying drawings, forming part of this specification, in which—

Figure 2:
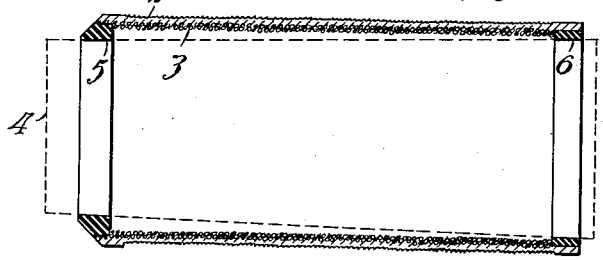

Figure 1 represents a longitudinal section through a record made in accordance with my invention, and Fig. 2 is a longitudinal section through a similar record formed with bearing rings and shown mounted on the taper mandrel which is shown in dotted lines.

Referring to the drawings, the record 1 is formed having a smooth hard non-porous outer surface 2 and a porous spongy backing or body portion 3. In Fig. 2, a record of this character is shown mounted on the taper mandrel 4, the record being formed with suitable bearing rings 5 and 6. A record similar to that disclosed in Fig. 2 may be formed by casting the record material in a rotating mold in which bearing rings of hard rubber or other suitable material or of the final condensation product of a resinized phenol have been secured in position previous to the pouring of the record, in the manner disclosed in my application No. 493,053, filed April 29, 1909.

As is well known, the reaction between a phenol and an aldehyde is accompanied by the evolution of dissociation gases unless a counteracting pressure is employed. In the case of the process described and claimed in this application, the speed of rotation of the mold is insufficient to generate a counteracting pressure due to the centrifugal action sufficient to counteract the evolution of gases with substances in the proportions used. In the formula above referred to as Formula No. 1 in my application No. 496,060, a certain proportion of benzoic anhydrid is included, this being an element which I denote a "final product solvent element" since it has the quality of combining or entering into solution with the other ingredients at an elevated temperature, causing the product to become somewhat plastic and free from internal stresses at such temperature, and forming a solid solution with the other ingredients of the product when cold. This material or materials having similar properties, as described in my above mentioned application, may be used or not as desired, in the spongy record composition here described and claimed.

The benzoic anhydrid in addition to being a "final product solvent element" is also a "water combining element," as described in my application Serial No. 496,060 referred to, that is, it has the properties of combining during the reaction with any traces of water which may be contained in the substance. Any other substance, such as various anhydrids or organic acids, may be used as an ingredient in the composition, to perform the same function if desired. Also it is to be understood that I am not limited to the substances in proportions referred to in the above mentioned formula, but that various combinations of phenols or phenolic substances and aldehydes or other substances containing the methylene radical $CH_2$ in various proportions may be used with good results so long as the proportion of aldehyde or methylene containing substance is sufficient to cause the copious evolution of gases in the mass during the formation of the record at the speed of rotation necessary to form the record.

While I have described my invention specifically in connection with phenol condensation products, it is to be understood that I am not necessarily limited thereto. For example, a celluloid record may be formed having the general characteristics of my invention. In practising the invention with this substance, a thin film of celluloid is first formed on the bore of the record from a suitable solution by evaporating away the solution to form a non-porous outer surface for the record cylinder. A further solution of celluloid is then introduced into the rotating mold and evaporation carried on more quickly than in the formation of the outer film, to cause foaming of the substance during the evaporation and the consequent formation of the spongy celluloid body or backing.

Having now described my invention, what I claim and desire to protect by Letters Patent is as follows:

1. The process of molding sound records which comprises forming a smooth non-porous surface portion in contact with the surface of a mold and forming a spongy porous backing or body for said surface by causing the material for said backing or body to harden while causing the same to foam copiously, substantially as described.

2. The process of molding sound records which comprises forming a smooth non-porous surface portion from fluid material in contact with the surface of a rotating mold and forming a spongy porous backing or body for said surface portion by causing the material for said backing or body to harden while causing the same to foam copiously during the rotation of the mold, substantially as described.

3. The process of molding sound records, consisting in introducing into a mold substances which react on application of heat to form an infusible condensation product, supplying heat sufficient to cause the reaction to ensue to form a record having a smooth non-porous record surface, and rendering the backing of the record porous by the copious evolution of dissociation gases, substantially as described.

4. The process of molding sound records, consisting in mixing together a phenol resin with more than sufficient aldehyde to combine therewith without evolution of gas, and heating the same in a rotating mold to form centrifugally without counteracting pressure, a record having a smooth outer surface while rendering the body of the record porous by the evolution of gases, substantially as described.

5. The process of molding sound records, consisting in mixing together a phenol resin and a small percentage of a final product solvent element with more than sufficient aldehyde to combine therewith without evolution of gas, and heating the same in a rotating mold to form centrifugally without a counteracting pressure, a record having a smooth outer surface while rendering the body of the record porous by the evolution of gases, substantially as described.

6. The process of molding sound records, consisting in forming centrifugally a record surface layer of a phenol-aldehyde condensation product on the bore of a rotating mold, causing the reaction between the components to ensue *in situ* to form a hard infusible final condensation product without the evolution of dissociation gases in said layer and forming on the bore of the said layer, and in the same manner, a backing of similar materials with excess of aldehyde and with evolution of gases to form a spongy material, substantially as described.

7. The process of molding sound records which comprises introducing into a suitable mold a phenolic substance and more than sufficient methylene containing substances to combine therewith without evolution of gas and heating of said substances to form a hardened infusible condensation product and to cause the copious evolution of dissociation gases, substantially as described.

8. The process of molding sound records which comprises introducing into a suitable mold a phenolic substance and more than sufficient methylene containing substances to combine therewith without evolution of gas, rotating the mold, and heating said substances to form a hardened infusible condensation product and to cause the copious evolution of dissociation gases, substantially as described.

This specification signed and witnessed this 4 day of Sept., 1912.

JONAS W. AYLSWORTH.

Witnesses:
FREDERICK BACHMANN,
MARY J. LAIDLAW.